(12) United States Patent
Sinha

(10) Patent No.: US 10,311,123 B2
(45) Date of Patent: *Jun. 4, 2019

(54) PERSONALIZED WEBSITE PRESENTATION

(71) Applicant: Empire Technology Development LLC, Wilmington, DE (US)

(72) Inventor: Mukul Kumar Sinha, Uttar Pradesh (IN)

(73) Assignee: Empire Technology Development LLC, Wilmington, DE (US)

( * ) Notice: Subject to any disclaimer, the term of this patent is extended or adjusted under 35 U.S.C. 154(b) by 689 days.

This patent is subject to a terminal disclaimer.

(21) Appl. No.: 14/992,147

(22) Filed: Jan. 11, 2016

(65) Prior Publication Data

US 2016/0124980 A1 May 5, 2016

Related U.S. Application Data

(63) Continuation of application No. 14/325,501, filed on Jul. 8, 2014, now Pat. No. 9,268,752, which is a
(Continued)

(30) Foreign Application Priority Data

Jun. 30, 2009 (IN) .......................... 1350/DEL/2009

(51) Int. Cl.
*G06F 15/16* (2006.01)
*G06F 16/958* (2019.01)
(Continued)

(52) U.S. Cl.
CPC .......... *G06F 16/958* (2019.01); *G06F 3/0482* (2013.01); *G06F 16/951* (2019.01);
(Continued)

(58) Field of Classification Search
CPC ......... G06F 17/30864; G06F 17/30867; G06F 17/2247; G06F 3/0482; G06Q 30/0255
(Continued)

(56) References Cited

U.S. PATENT DOCUMENTS

| 5,918,013 A | 6/1999 | Mighdoll et al. |
| 6,064,979 A | 5/2000 | Perkowski |

(Continued)

FOREIGN PATENT DOCUMENTS

| CN | 1643518 A | 7/2005 |
| WO | 2011001238 A1 | 1/2011 |

OTHER PUBLICATIONS

International Search Report and Written Opinion for International Application No. PCT/IB2010/001438 dated Sep. 21, 2010.
(Continued)

*Primary Examiner* — Bharat Barot

(57) ABSTRACT

Systems and methods of dynamically presenting a website. The system includes a storage medium and a server. The storage medium includes data adapted for presentation on a first website. The server includes computer executable instructions configured to receive initial preference data and build a preference profile based on the initial preference data. The server also includes computer executable instructions configured to retrieve select first data from the storage medium based on the preference profile, structure a presentation of the first website based on the select first data; and provide targeted queries or prompts based on the first data.

20 Claims, 39 Drawing Sheets

Related U.S. Application Data continuation of application No. 12/551,175, filed on Aug. 31, 2009, now Pat. No. 8,788,622.

(51) Int. Cl.

| | | |
|---|---|---|
| *G06F 17/30* | (2006.01) | |
| *G06F 16/951* | (2019.01) | |
| *G06F 16/9535* | (2019.01) | |
| *G06Q 30/00* | (2012.01) | |
| *G06F 17/22* | (2006.01) | |
| *G06Q 30/02* | (2012.01) | |
| *G06F 3/0482* | (2013.01) | |

(52) U.S. Cl.
CPC ...... *G06F 16/9535* (2019.01); *G06F 17/2247* (2013.01); *G06F 17/3089* (2013.01); *G06F 17/30864* (2013.01); *G06F 17/30867* (2013.01); *G06Q 30/00* (2013.01); *G06Q 30/0255* (2013.01)

(58) Field of Classification Search
USPC .................................. 709/202–205, 217–219
See application file for complete search history.

(56) References Cited

U.S. PATENT DOCUMENTS

| | | |
|---|---|---|
| 6,839,760 B1 | 1/2005 | Walters |
| 6,912,532 B2 | 6/2005 | Andersen |
| 7,089,278 B1 | 8/2006 | Churchill et al. |
| 7,337,158 B2 | 2/2008 | Fratkina et al. |
| 7,353,460 B2 | 4/2008 | Tu |
| 7,873,648 B2 | 1/2011 | Jaepel et al. |
| 7,890,581 B2 | 2/2011 | Rao et al. |
| 7,925,743 B2 * | 4/2011 | Neely ............... G06F 17/30864 709/203 |
| 8,577,875 B2 * | 11/2013 | Ramsey ............ G06F 17/30696 707/669 |
| 8,788,622 B2 * | 7/2014 | Sinha ............... G06F 17/30867 709/218 |
| 8,825,734 B2 | 9/2014 | Roy et al. |
| 9,268,752 B2 * | 2/2016 | Sinha ............... G06F 17/30867 |
| 2002/0029267 A1 | 3/2002 | Sankuratripati et al. |
| 2002/0154157 A1 | 10/2002 | Sherr et al. |
| 2004/0078452 A1 | 4/2004 | Jamieson |
| 2005/0172035 A1 | 8/2005 | Morris |
| 2006/0184640 A1 | 8/2006 | Hatch |
| 2008/0189391 A1 | 8/2008 | Koberstein et al. |
| 2008/0209336 A1 | 8/2008 | Brown et al. |
| 2009/0265607 A1 | 10/2009 | Raz et al. |
| 2010/0094878 A1 | 4/2010 | Soroca et al. |
| 2011/0066697 A1 | 3/2011 | Lv et al. |
| 2011/0173521 A1 * | 7/2011 | Horton ................. G06Q 30/02 715/202 |
| 2011/0179119 A1 | 7/2011 | Penn |
| 2014/0006556 A1 * | 1/2014 | Shapiro ............ H04N 21/25891 709/217 |
| 2015/0032814 A1 * | 1/2015 | Broustas ............ G06Q 30/0631 709/204 |

OTHER PUBLICATIONS

Miller, G.A., "The Magical Number Seven, Plus or Minus Two: Some Limits on Our Capacity of Processing Information," Psychological Review, vol. 63, No. 2, pp. 81-97 (Mar. 1956).

* cited by examiner

300

| 302 |
|---|
| 304 |
| 306 |
| 308 |
| 310 |
| 312 |
| 314 |
| 316 |

Fig. 3

Delhi Tourisms /Tourist

Monuments

Museums

Archaeological

Religious Places

Shopping Places

Famous Buildings

Fig. 4

Photograph of
Qutab Minar

Advertisement

Perspective

The tall and ever attractive monument of Delhi which can be seen from most parts of the city is called the Qutab Minar. Qutab Minar is among the tallest and famous towers in the world. The minaret is 234 feet high and the highest individual tower in the world. Other towers in the world are the Great Pagoda in Pekin, China and the Leaning Tower of Pisa in Italy but these towers are not as high as the Qutab Minar in Delhi.

Tourist

History

Monument

Archaeology

Delhi Tourisms /Tourist

Monuments

Museums

Religious Places

Famous Building

Shopping Places

Fig. 5

Photograph of the Red Fort

THE RED FORT more popularly known as The Lal Quila (Lal ie. red and Quila ie.fort), stands strong on the banks of the river Yamuna as an irregular octagon. It is surrounded by a wall of about 2.4 Kilometers in circumferance and is built of Red Sandstone. The Mughal king Shah Jahan (popular for building the Taj Mahal of Agra) transferred his capital from Agra to Delhi and the fort was completed in 1648, nine years after the king shifted to this city. The fort has two main entrances, the Delhi Gate and the Lahori Gate which faces the famed Chandni Chowk market.

More>>   Back

Advertisement

Sub/Perspective

Most Popular

Historical

Religious

Educational

Delhi Tourisms /Tourist

Monuments

Museums       Photograph of the Red Fort       Advertisement

Religious Places

Famous Building

Shopping Places

This fort situated in Old Delhi is a reminder of the magnificent power and pomp of the Mughal emperors. The red sandstone walls of the massive Red Fort rise 33m were designed to keep out invaders, but today they mainly keep out the noise and confusion of the city, making the fort and its gardens and pavilions a peaceful heaven from the surrounding chaos. The fort's main gate, the Lahore Gate, is one of the emotional and symbolic focal points of the modern Indian nation.

SubPerspective

Most Popular

Historical

Religious

Educational

<<Back     Back

Fig. 6

Delhi Tourisms /Tourist

Monuments
- Qutab Minar
- Lal Qila
- Humayun Tomb
- Purana Qila
- Jantar Mantar
- India Gate
- Tughlakabad Fort Mus...
Reli...
Fam...

Shopping Places

Photograph of the Red Fort

THE RED FORT more popularly known as The Lal Quila (Lal ie. red and Quila ie.fort), stands strong on the banks of the river Yamuna as an irregular octagon. It is surrounded by a wall of about 2.4 Kilometers in circumferance and is built of Red Sandstone. The Mughal king Shah Jahan (popular for building the Taj Mahal of Agra) transferred his capital from Agra to Delhi and the fort was completed in 1648, nine years after the king shifted to this city. The fort has two main entrances, the Delhi Gate and the Lahori Gate which faces the famed Chandni Chowk market.

More>>

Advertisement

Sub/Perspective

Most Popular

Historical

Religious

Educational

Fig. 7

Delhi Tourisms /Tourist

Monuments

Museums
- National Museum
- Lalit Kala Academy
- Art & Craft

Religious

Famous Buildings

Shopping Places

Photograph of the Red Fort

THE RED FORT more popularly known as The Lal Quila (Lal ie. red and Quila ie.fort), stands strong on the banks of the river Yamuna as an irregular octagon. It is surrounded by a wall of about 2.4 Kilometers in circumferance and is built of Red Sandstone. The Mughal king Shah Jahan (popular for building the Taj Mahal of Agra) transferred his capital from Agra to Delhi and the fort was completed in 1648, nine years after the king shifted to this city. The fort has two main entrances, the Delhi Gate and the Lahori Gate which faces the famed Chandni Chowk market.

More>>

Advertisement

Sub/Perspective

Most Popular

Historical

Religious

Educational

Fig. 8

Delhi Tourisms /Tourist

Monuments

Museums

Religious

- Jama Masjid
- Hazrat Nizamuddin
- AksharDham Mandir
- BirlaTemple
- Sis Ganj GuruDwara Famous Shopping Places Photograph of the Red Fort THE RED FORT more popularly known as The Lal Quila (Lal ie. red and Quila ie.fort), stands strong on the banks of the river Yamuna as an irregular octagon. It is surrounded by a wall of about 2.4 Kilometers in circumferance and is built of Red Sandstone. The Mughal king Shah Jahan (popular for building the Taj Mahal of Agra) transferred his capital from Agra to Delhi and the fort was completed in 1648, nine years after the king shifted to this city. The fort has two main entrances, the Delhi Gate and the Lahori Gate which faces the famed Chandni Chowk market.

More>>

Advertisement

Sub/Perspective

Most Popular

Historical

Religious

Educational

Fig. 9

Delhi Tourisms /Tourist

Monuments

Museums           Photograph of the Red Fort        Advertisement

Religious Places

Famous Buildings

| President's House |
| Sansad Bhawan |

Shopping Places

THE RED FORT more popularly known as The Lal Quila (Lal ie. red and Quila ie.fort), stands strong on the banks of the river Yamuna as an irregular octagon. It is surrounded by a wall of about 2.4 Kilometers in circumferance and is built of Red Sandstone. The Mughal king Shah Jahan (popular for building the Taj Mahal of Agra) transferred his capital from Agra to Delhi and the fort was completed in 1648, nine years after the king shifted to this city. The fort has two main entrances, the Delhi Gate and the Lahori Gate which faces the famed Chandni Chowk market.

SubPerspective

Most Popular

Historical

Religious

Educational

Fig. 10

More>>

Delhi Tourisms /Tourist

Monuments

Museums      Photograph of the Red Fort      Advertisement

Religious Places

Famous Buildings

Shopping

| Chandi Chowk |
| Connaught Place |
| Sarojini Nagar |
| Janpat |
| Dariya Ganj |
| Lajpat Nagar |
| Delhi Haat |

THE RED FORT more popularly known as The Lal Quila (Lal ie. red and Quila ie. fort), stands strong on the banks of the river Yamuna as an irregular octagon. It is surrounded by a wall of about 2.4 Kilometers in circumferance and is built of Red Sandstone. The Mughal king Shah Jahan (popular for building the Taj Mahal of Agra) transferred his capital from Agra to Delhi and the fort was completed in 1648, nine years after the king shifted to this city. The fort has two main entrances, the Delhi Gate and the Lahori Gate which faces the famed Chandni Chowk market.

More>>

SubPerspective

Most Popular

Historical

Religious

Educational

Fig. 11

Delhi Most Popular

Monuments

Religious Places

Historical Places/Sites

Famous Buildings

Shopping Places

Photograph of the India Gate

Advertisement

India Gate is situated on the Raj Path of New Delhi. India Gate was built by Edwin Lutyens to pay homage to the Indian soldiers who died in the World War I and the Afgan War. Closely looking at the walls of India Gate would let you know the names of 90,000 soldiers who died during the World War I, the Afgan War and the North-West Frontier operations. The structure was finally completed in the year 1931. India Gate was originally called the All India War Memorial.

More>>   Back

Fig. 12

Delhi Most Popular

Monuments

Religious Places

Historical Places/Sites

Famous Buildings

Shopping Places

*Fig. 13*

Photograph of the India Gate

Advertisement

The night view of India Gate looks very majestic with children and families enjoying the evening. There is a lawn throughout the stretch of the Rajpath and people love coming here again and again. A summer evening is the best time to enjoy the surroundings of India Gate. During winters, lawns around India Gate and Rajpath are hot favorites for a picnic spot.

<<Back   Back

Delhi Most Popular

Monu | Qutab Minar
Religi | Lal Qila
     | India Gate
Histo | Jantar Mantar

Famous Buildings

Shopping Places

*Fig. 14*

Photograph of the India Gate

Advertisement

India Gate is situated on the Raj Path of New Delhi. India Gate was built by Edwin Lutyens to pay homage to the Indian soldiers who died in the World War I and the Afgan War. Closely looking at the walls of India Gate would let you know the names of 90,000 soldiers who died during the World War I, the Afgan War and the North-West Frontier operations. The structure was finally completed in the year 1931. India Gate was originally called the All India War Memorial.

More>> Back

Delhi Most Popular

Monuments

Religions Of

- Jama Masjid
- Hazrat Nizamuddin
- Akshar Dham
- Bahai Temple

Historical

Famous Buildings

Shopping Places

Photograph of the India Gate

Advertisement

India Gate is situated on the Raj Path of New Delhi. India Gate was built by Edwin Lutyens to pay homage to the Indian soldiers who died in the World War I and the Afgan War. Closely looking at the walls of India Gate would let you know the names of 90,000 soldiers who died during the World War I, the Afgan War and the North-West Frontier operations. The structure was finally completed in the year 1931. India Gate was originally called the All India War Memorial.

More>> Back

Fig. 15

Delhi Most Popular

Monuments

Religious Places

Historical Places/Sites

| Safdar Jung Tomb |
| Ashoka Engravings |

Famous Buildings

Shopping Places

Photograph of the India Gate

Advertisement

India Gate is situated on the Raj Path of New Delhi. India Gate was built by Edwin Lutyens to pay homage to the Indian soldiers who died in the World War I and the Afgan War. Closely looking at the walls of India Gate would let you know the names of 90,000 soldiers who died during the World War I, the Afgan War and the North-West Frontier operations. The structure was finally completed in the year 1931. India Gate was originally called the All India War Memorial.

More>>   Back

Fig. 16

Delhi Most Popular

Monuments

Religious Places  —  Photograph of the India Gate  —  Advertisement

Historical Places/Sites

Famous Buildings

| President's House |
| Sansad Bhawan |

Shopping Place

*Fig. 17*

India Gate is situated on the Raj Path of New Delhi. India Gate was built by Edwin Lutyens to pay homage to the Indian soldiers who died in the World War I and the Afgan War. Closely looking at the walls of India Gate would let you know the names of 90,000 soldiers who died during the World War I, the Afgan War and the North-West Frontier operations. The structure was finally completed in the year 1931. India Gate was originally called the All India War Memorial.

More>>   Back

Delhi Most Popular

Monuments

Religious Places

Historical Places/Sites

Famous Buildings

Shopping

| Photograph of the India Gate | Advertisement |

| Connaught Place |
| Chandi Chowk |
| Janpat |

Fig. 18

India Gate is situated on the Raj Path of New Delhi. India Gate was built by Edwin Lutyens to pay homage to the Indian soldiers who died in the World War I and the Afgan War. Closely looking at the walls of India Gate would let you know the names of 90,000 soldiers who died during the World War I, the Afgan War and the North-West Frontier operations. The structure was finally completed in the year 1931. India Gate was originally called the All India War Memorial.

More>>  Back

Delhi Tourism Historical Perspective

Ancient

Sultanate

Mughal Period

British Period

Events

Fig. 19

Photograph of the Qutub Minar

Advertisement

The tall and ever attractive monument of Delhi which can be seen from most parts of the city is called the Qutab Minar. Qutab Minar is among the tallest and famous towers in the world. The minaret is 234 feet high and the highest individual tower in the world. Other towers in the world are the Great Pagoda in Pekin, China and the Leaning Tower of Pisa in Italy but these towers are not as high as the Qutab Minar in Delhi.

More>>    Back

Delhi Tourism Historical Perspective

Ancient

Sultanate

Mughal Period

British Period

Events

Fig. 20

Photograph of the Qutub Minar

Advertisement

Qutab Minar is another great masterpiece of Mughal architecture. It has a number of floors or storeys which has beautiful carvings like the one on the Tomb of Iltutmish. There are inscriptions all round the tower and these inscriptions reveal that Iltutmish finised the tower. The structure of the wall is made as such that it widens from top to bottom, just to make the minar stronger.

<<Back   Back

Delhi Tourism Historical Perspective

Ancient

- Ashoka Engravings
- Purana Qila

Sulta
- Prithvi Raj (Saket)

Mughal Period

British Period

Events

Fig. 21

Photograph of the Qutab Minar

Advertisement

The tall and ever attractive monument of Delhi which can be seen from most parts of the city is called the Qutab Minar. Qutab Minar is among the tallest and famous towers in the world. The minaret is 234 feet high and the highest individual tower in the world. Other towers in the world are the Great Pagoda in Pekin, China and the Leaning Tower of Pisa in Italy but these towers are not as high as the Qutab Minar in Delhi.

More>>   Back

Delhi Tourism Historical Perspective

Ancient

Sultanate

| Qutab Minar |
| Tughlakabad Fort |
| Safdar Jung |
| Hauz Khas |
| Jamali Kamali |

Mughal

British

Events

Photograph of the Qutab Minar

Advertisement

The tall and ever attractive monument of Delhi which can be seen from most parts of the city is called the Qutab Minar. Qutab Minar is among the tallest and famous towers in the world. The minaret is 234 feet high and the highest individual tower in the world. Other towers in the world are the Great Pagoda in Pekin, China and the Leaning Tower of Pisa in Italy but these towers are not as high as the Qutab Minar in Delhi.

More>>    Back

Fig. 22

Delhi Tourism Historical Perspective

Ancient

Sultanate

Mughal Period

|Red Fort|
|Humayun Tomb|
|Jantar Mantar|

British

Events

Photograph of the Qutab Minar

Advertisement

The tall and ever attractive monument of Delhi which can be seen from most parts of the city is called the Qutab Minar. Qutab Minar is among the tallest and famous towers in the world. The minaret is 234 feet high and the highest individual tower in the world. Other towers in the world are the Great Pagoda in Pekin, China and the Leaning Tower of Pisa in Italy but these towers are not as high as the Qutab Minar in Delhi.

More>>   Back

Fig. 23

Delhi Tourism Historical Perspective

Ancient

Sultanate          Photograph of the Qutab Minar        Advertisement

Mughal Period

British Period

| President House |
| Teen Murti Bhawan |
| Sansad Bhawan |
| Supreme Court |

Events    The tall and ever attractive monument of Delhi which can be seen from most parts of the city is called the Qutab Minar. Qutab Minar is among the tallest and famous towers in the world. The minaret is 234 feet high and the highest individual tower in the world. Other towers in the world are the Great Pagoda in Pekin, China and the Leaning Tower of Pisa in Italy but these towers are not as high as the Qutab Minar in Delhi.

Fig. 24

More>>    Back

Delhi Tourism Historical Perspective

Ancient

Sultanate

Mughal Period

British Period

Event

| Photograph of the Qutab Minar | Advertisement |

| Sis Ganj |
| Khooni Darwaza |
| Raj Ghat |
| Gandhi Smriti |

The tall and ever attractive monument of Delhi which can be seen from most parts of the city is called the Qutab Minar. Qutab Minar is among the tallest and famous towers in the world. The minaret is 234 feet high and the highest individual tower in the world. Other towers in the world are the Great Pagoda in Pekin, China and the Leaning Tower of Pisa in Italy but these towers are not as high as the Qutab Minar in Delhi.

More>>   Back

Fig. 25

Delhi Tourism Religious Perspective

Hindu Religion

Islam Religion

Sikh/Others Religion

Famous Buildings

Shopping Places

Historical Places/Sites

Photograph of the Akshardham Temple

Advertisement

Akshardham Temple in Delhi has an important place in Delhi's tourism. The structure depicts great Indian culture and its architecture is simply immaculate. This amazing structure comprises of 20,000 statues, floral motifs and exquisite carved pillars made of stones.

Fig. 26

More>>   Back

Delhi Tourism Religious Perspective

Hindu Religion

Islam Religion

Sikh/Others Religion

Famous Buildings

Shopping Places

Historical Places/Sites

Fig. 27

Photograph of the Akshardham Temple

Akshardham Temple is a magnificent Hindu shrine, situated in the east region of New Delhi. Located on the banks of River Yamuna, it was inaugurated in November 2005, by the former President of India - APJ Abdul Kalam, the Prime Minister - Manmohan Singh and Pramukh Swami Maharaj - the spiritual leader of BAPS.

Advertisement

<<Back  Back

Delhi Tourism Religious Perspective

Hindu Religious
- Kalka Ji Temple
- Akshar Dham

Islam Religious

Sikh/Others Religion

Famous Buildings

Shopping Places

Historical Places/Sites

Photograph of the Akshardham Temple

Advertisement

Akshardham Temple in Delhi has an important place in Delhi's tourism. The structure depicts great Indian culture and its architecture is simply immaculate. This amazing structure comprises of 20,000 statues, floral motifs and exquisite carved pillars made of stones.

Fig. 28

More>>  Back

Delhi Tourism Religious Perspective

Hindu Religion

Islam Religion
- Jama Masjid
- Hazrat Nizamuddin

Sikh/Others Religion

Famous Buildings

Shopping Places

Historical Places/Sites

Photograph of the Akshardham Temple

Advertisement

Akshardham Temple in Delhi has an important place in Delhi's tourism. The structure depicts great Indian culture and its architecture is simply immaculate. This amazing structure comprises of 20,000 statues, floral motifs and exquisite carved pillars made of stones.

Fig. 29

More>> Back

Delhi Tourism Religious Perspective

Hindu Religion

Islam Religion

Sikh/ | SisGanj |
| Bangla Sahib |

Famo | Shakti Sthal |
| Lal Mandir |

Shopping Places

Historical Places/Sites

Photograph of the Akshardham Temple

Advertisement

Akshardham Temple in Delhi has an important place in Delhi's tourism. The structure depicts great Indian culture and its architecture is simply immaculate. This amazing structure comprises of 20,000 statues, floral motifs and exquisite carved pillars made of stones.

Fig. 30

More>> Back

Delhi Tourism Religious Perspective

Hindu Religion

Islam Religion

Sikh/Others Religion

Famous Buildings

President's House
Sansad Bhawan

Shopping Places

Historical Places/Sites

Photograph of the Akshardham Temple

Advertisement

Akshardham Temple in Delhi has an important place in Delhi's tourism. The structure depicts great Indian culture and its architecture is simply immaculate. This amazing structure comprises of 20,000 statues, floral motifs and exquisite carved pillars made of stones.

Fig. 31

More>> Back

Delhi Tourism Religious Perspective

Hindu Religion

Islam Religion

Sikh/Others Religion

Famous Buildings

Shopping Places

| Connaught Place |
| Chandi Chowk |
| Lajpat Nagar |
| Janpat |

Historical

Photograph of the Akshardham Temple

Advertisement

Akshardham Temple in Delhi has an important place in Delhi's tourism. The structure depicts great Indian culture and its architecture is simply immaculate. This amazing structure comprises of 20,000 statues, floral motifs and exquisite carved pillars made of stones.

Fig. 32

More>>  Back

Delhi Tourism Religious Perspective

Hindu Religion

Islam Religion

Sikh/Others Religion

Famous Buildings

Shopping Places

Historical Places/Sites

| Safdar Jung Tomb |
| Ashoka Engravings |

Photograph of the Akshardham Temple

Advertisement

Akshardham Temple in Delhi has an important place in Delhi's tourism. The structure depicts great Indian culture and its architecture is simply immaculate. This amazing structure comprises of 20,000 statues, floral motifs and exquisite carved pillars made of stones.

Fig. 33

More>>   Back

Delhi Tourism Education Perspective

Ancient

Mughal Period

British Period

Famous Institute

Photograp of Delhi University

Advertisement

The University was established in the year 1922, with just three colleges under its umbrella namely St. Stephens College (founded in 1881), Hindu College (founded in 1899) and Ramjas College (founded in 1917), University Of Delhi, North Campus, Near Mall Road.

Fig. 34

More>>    Back

Delhi Tourism Education Perspective

Ancient

Mughal Period

British Period

Famous Institute

Photograph of Delhi University

Advertisement

Delhi University

With more than 80 colleges under its umbrella, the University of Delhi, better known as DU, is definitely the most prestigious universities in the country today. The varsity is known for its high standards in teaching and research. The university has been ranked one of the best universities in the world.

<<Back    Back

Fig. 35

Delhi Tourism Education Perspective

Ancient

Mughal
- Ashoka Engravings
- Purana Qila
- Qutab Minar
- Tughlakabad Fort
- Hauz Khas British Photograph of Delhi University Advertisement Famous Institute

*The University* was established in the year 1922, with just three colleges under its umbrella namely St. Stephens College (founded in 1881), Hindu College (founded in 1899) and Ramjas College (founded in 1917). University Of Delhi, North Campus, Near Mall Road.

Fig. 36

More>> Back

Delhi Tourism Education Perspective

Ancient

Mughal Period

| Red Fort |
| Humanyu Tomb |
| Jaantar Maantar |

British

Famous Institute

Photograph of Delhi University

Advertisement

The University was established in the year 1922, with just three colleges under its umbrella namely St. Stephens College (founded in 1881), Hindu College (founded in 1899) and Ramjas College (founded in 1917). University Of Delhi, North Campus, Near Mall Road.

Fig. 37

More>>  Back

Delhi Tourism Education Perspective

Ancient

Mughal Period

British Period

Famous
- President House
- Supreme Court
- Teen Murti Bhawan
- Sansad Bhawan

Photograph of Delhi University

Advertisement

The University was established in the year 1922, with just three colleges under its umbrella namely St. Stephens College (founded in 1881), Hindu College (founded in 1899) and Ramjas College (founded in 1917). University Of Delhi, North Campus, Near Mall Road.

Fig. 38

More>> Back

Delhi Tourism Education Perspective

Ancient

Mughal Period

British Period

Famous Institute

| Delhi University (DU) |
| JNU |
| IIT |
| Jamia Millia Islamia |

Photograph of Delhi University

Advertisement

The University was established in the year 1922, with just three colleges under its umbrella namely St. Stephens College (founded in 1881), Hindu College (founded in 1899) and Ramjas College (founded in 1917). University Of Delhi, North Campus, Near Mall Road.

Fig. 39

More>> Back

PERSONALIZED WEBSITE PRESENTATION

CROSS-REFERENCE TO RELATED APPLICATIONS

The present application is a continuation of U.S. application Ser. No. 14/325,501 filed Jul. 8, 2014; which is a Continuation of U.S. application Ser. No. 12/551,175, filed Aug. 31, 2009, (now U.S. Pat. No. 8,788,622 issued Jul. 22, 2014); which claims priority to Indian application number 1350/DEL/2009, filed Jun. 30, 2009, the entire disclosures of which are incorporated herein by reference.

BACKGROUND

There are many websites where users regularly visit either to access information that periodically changes (e.g., newspapers, journals, TV Channels, etc.) or to plan their weekends, vacations (e.g., tourist information, leisure information, etc.), or to collect their e-mails (e-mail portals), or to buy books, clothing, movies or other consumer products. These types of sites are designed with the knowledge that multiple types of users will visit their sites. Generally, the navigation structure of the website is designed based on this knowledge. Further, websites are designed with the presumption that a user navigates by himself/herself. Most of the times such websites have an enormous amount of information. Often users get lost while navigating, get distracted to various other links, or spend far more time than anticipated or needed. In the end, the user may feel exhausted and decide to either not visit the site again, or plan to visit the site only when he or she has sufficient time to spare. This may result in the decrease of user visits. Additionally, advertisements on websites are typically placed on the website based on presumption that persons with specific interest would visit that website the most. That is, the advertisements are geared toward a narrow subset of all visitors, albeit the presumed most likely visitor. Furthermore, the advertisements of the website may also become irritating to those persons who do not share the specific interest.

To address these problems, websites (e.g., News Paper/TV Channel sites) that attract regular visitors advises users to provide information for a "user profile". The user profile typically includes both personal information about the user and personal preferences data. The personal information may include such information as the user's name, address, and telephone number. The preference data may vary with the type of website. For example, the web page of an electronic bookstore may keep data about the user's favorite author and/or favorite genre. The user profile may be stored in a database on the website's server or in a cookie residing on the user's computer. The user profile helps the website to present itself as more user-friendly to the visiting users by orienting itself according to the visitor's user profile.

The concept of user profiles, however, is not meaningful for the navigation of those sites that have occasional visitors. In particular, user profiles are not helpful for websites that have large information content and which typically attracts occasional visitors with specific needs/intentions. These websites may be visited only once by users seeking specific information or may not be visited again for a very long time when a new need for information arises.

BRIEF DESCRIPTION OF THE DRAWINGS

FIG. 3 is a schematic diagram of a method according to an embodiment.

FIG. 4 is a plan view illustrating a guided web page according to an embodiment.

FIG. 5 is a plan view illustrating a further view of the embodiment illustrated in FIG. 4.

FIG. 6 is a plan view illustrating a further view of the embodiment illustrated in FIG. 4.

FIG. 7 is a plan view illustrating a further view of the embodiment illustrated in FIG. 4.

FIG. 8 is a plan view illustrating a further view of the embodiment illustrated in FIG. 4.

FIG. 9 is a plan view illustrating a further view of the embodiment illustrated in FIG. 4.

FIG. 10 is a plan view illustrating a further view of the embodiment illustrated in FIG. 4.

FIG. 11 is a plan view illustrating a further view of the embodiment illustrated in FIG. 4.

FIG. 12 is a plan view illustrating a further view of the embodiment illustrated in FIG. 4.

FIG. 13 is a plan view illustrating a further view of the embodiment illustrated in FIG. 4.

FIG. 14 is a plan view illustrating a further view of the embodiment illustrated in FIG. 4.

FIG. 15 is a plan view illustrating a further view of the embodiment illustrated in FIG. 4.

FIG. 16 is a plan view illustrating a further view of the embodiment illustrated in FIG. 4.

FIG. 17 is a plan view illustrating a further view of the embodiment illustrated in FIG. 4.

FIG. 18 is a plan view illustrating a further view of the embodiment illustrated in FIG. 4.

FIG. 19 is a plan view illustrating a further view of the embodiment illustrated in FIG. 4.

FIG. 20 is a plan view illustrating a further view of the embodiment illustrated in FIG. 4.

FIG. 21 is a plan view illustrating a further view of the embodiment illustrated in FIG. 4.

FIG. 22 is a plan view illustrating a further view of the embodiment illustrated in FIG. 4.

FIG. 23 is a plan view illustrating a further view of the embodiment illustrated in FIG. 4.

FIG. 24 is a plan view illustrating a further view of the embodiment illustrated in FIG. 4.

FIG. 25 is a plan view illustrating a further view of the embodiment illustrated in FIG. 4.

FIG. 26 is a plan view illustrating a further view of the embodiment illustrated in FIG. 4.

FIG. 27 is a plan view illustrating a further view of the embodiment illustrated in FIG. 4.

FIG. 28 is a plan view illustrating a further view of the embodiment illustrated in FIG. 4.

FIG. 29 is a plan view illustrating a further view of the embodiment illustrated in FIG. 4.

FIG. 30 is a plan view illustrating a further view of the embodiment illustrated in FIG. 4.

FIG. 31 is a plan view illustrating a further view of the embodiment illustrated in FIG. 4.

FIG. 32 is a plan view illustrating a further view of the embodiment illustrated in FIG. 4.

FIG. 33 is a plan view illustrating a further view of the embodiment illustrated in FIG. 4.

FIG. 34 is a plan view illustrating a further view of the embodiment illustrated in FIG. 4.

FIG. 35 is a plan view illustrating a further view of the embodiment illustrated in FIG. 4.

FIG. 36 is a plan view illustrating a further view of the embodiment illustrated in FIG. 4.

FIG. 37 is a plan view illustrating a further view of the embodiment illustrated in FIG. 4.

FIG. 38 is a plan view illustrating a further view of the embodiment illustrated in FIG. 4.

FIG. 39 is a plan view illustrating a further view of the embodiment illustrated in FIG. 4.

DETAILED DESCRIPTION

Figure 1:
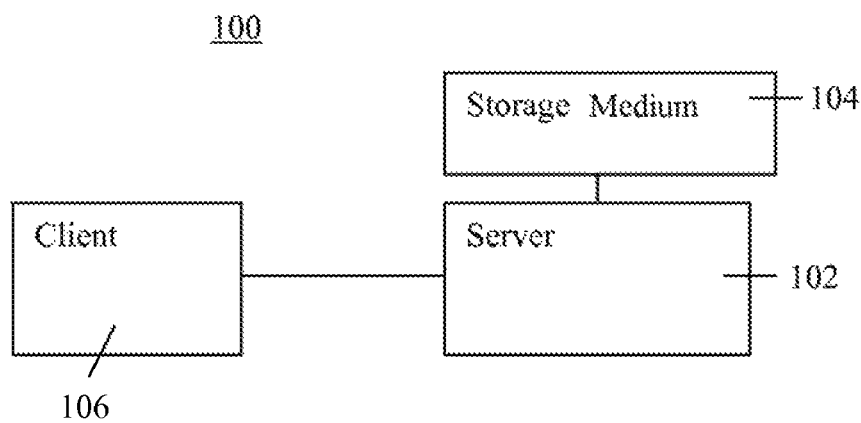
FIG. 1 is a schematic diagram of a system according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Typically, websites with a large information content are designed either to cater for a standard, most frequent type of visitor, or to cater for all types of visitors. In former case, a website becomes unsatisfactory to non-standard visitors while in the latter case, the information content is so high that a visitor finds it difficult to reach the information he is looking for as he is confronted with huge amount of information, leaving the visitor feeling lost. This is similar to a visit to a super market for grocery requirements. Most websites are designed like a super market which is very friendly for regular visitors or visitors with sufficient time and energy who can explore their way out. The super market, however, is not at all friendly for a non-local person who drops in to buy a pack of mineral water while was passing through that locality. Typically super markets keep some shop assistants who can guide such shoppers.

Typically, a website with large information content is designed with fixed structure. The structure is usually hierarchical with few special additional entry links for user to explore/navigate, often without restriction to all the information content on the website. Further, almost all websites are designed with an intention to increase the number of visitors, and also to increase the time spent by the visitors on their websites. Thus, increasing their advertisement revenue (similar to a TV channels' Target Rating Point). This has resulted adversely for serious website visitors, the visitors who visit a website with specific needs/intention. The serious website visitor either gets distracted to some other information link which he was not primarily interested in, or gets lost under the information heap. Often, the user does not reach the web page for which he was primarily searching. Facing these types of difficulties repeatedly at most of the websites, a serious user may undertake visiting a website only when he has sufficient time to spare, and not otherwise.

Conventional websites do not have web guides. At best, conventional websites have drop down menus which illustrate broad categories of available information or lists embedded links to bring one to a subset of the available data on the website. However, there are scenarios where a user would like a more proactive assistance with the website. That is, the user would like assistance navigating the website by a "web guide." For example, when a user visits the British Museum site, he may be interested in only Egyptian section of the museum, and even then only its artifacts; or a user visiting Jaigarh Fort in Jaipur may be interested in only in the warfare technology of that time, and nothing else. Navigating through the usual website structure would take a lot of time (and patience) for users to reach, if at all, to the appropriate web page. Many sites do provide a 'search' mechanism for navigation. These search mechanisms take you to the pages matching the exact search string, however, it may not be the page you were looking for.

In another example, consider an individual who visits any monument complex like the Taj Mahal, Agra Fort, Ajanta, or Ellora. Unless and until the tour is a detailed study tour with no time limitation, a visitor should either follow a 'general guide book' or hire a human guide, informing the guide of the visitor's interests and time limitations. The human guide then takes the visitor on a guided tour of the complex. Typically, a good human guide continuously interacts with the visitor and synchronizes the tour with the interest (and constraints) of the visitor. A good guided tour is memorable, leaving the visitor fully satisfied.

According to some embodiments, websites can be designed to facilitate the use of a web guide. Initially, a user specifies his or her initial interests which are collected to generate a preference profile for the website. Given the preference profile, web guide automatically restructures the website presentation in such a way the website looks as if it has been 'made for me'. That is, the presentation of the website is personalized for the user. Unlike conventional personalization which only allows the user to select a background, font color, and other limited choices, the web guide leads navigation of the website. That is, the web guide synchronizes the displayed web content (data, information, etc.) with the specified interests of the user. The web guide further provides the user with queries and prompts based on the user's preferences and the returned content to further guide the user in his/her navigation. The queries and prompts are designed to follow the logic of a human tour guide. That is, the queries and prompts of the web guide focus further searching by providing guidance that is related to the preferences already expressed by the user and thus more likely to be relevant to the user. The examples below illustrate the web guide in more detail.

A guided website would be more tempting to busy people who want to visit a website with specific purpose. This may lead to an increased foot-fall for the guided website.

Additionally, a guided website can focus the displayed advertisements to those visitors who only have an 'interest' related to the sought product. In other words, the website would not show the advertisement of Pirelli Calendar to a person looking for religious book. With this approach, the same advertisement slot can be shared by multiple advertisers and their advertisements would be shown to the visitors whose interest profile covers the product of the advertisement. Further, the advertiser could be charged proportionally to the time (or number) that its advertisement has been shown to the visitors.

An embodiment includes a server comprising computer executable instructions configured to present an initial home page, the initial home page including initial preference options, receive initial preference option data corresponding to the initial preference options, retrieve select first data based on the initial preference option data; and structure a first presentation of a website based on the select first data, the first presentation including a closed set of subsequent preference options based on the select first data. One aspect further comprises computer executable instructions configured to receive subsequent preference option data corresponding to the subsequent preference options, retrieve select second data based on the subsequent preference option data and structure a second presentation of the website based on the select second data. In another aspect, the second presentation of the website includes a second closed set of subsequent preference options based on the select second data. In another aspect, the select second data is retrieved from a second website, wherein the second website different from the first website.

In another aspect, the server further comprises computer executable instructions configured to include at least one advertisement in the presentation of the first website, the at least one advertisement based on the select first data. In another aspect, the select first data is wrapped in metadata, wherein the metadata describes the select first data and facilitates retrieval of the select first data. In another aspect, the initial preference options include default settings.

Another embodiment includes a system comprising a storage medium comprising data adapted for presentation on a first website and a server comprising computer executable instructions configured to present an initial home page, the initial home page including initial preference options, receive initial preference option data corresponding to the initial preference options, retrieve select first data based on the initial preference option data and structure a first presentation of a website based on the select first data, the first presentation including a closed set of subsequent preference options based on the select first data. In one aspect, the storage medium is within the server. In another aspect, the system further comprises computer executable instructions configured to provide subsequent reference options based on the first data. In another aspect, the system further comprises computer executable instructions configured to receive subsequent preference option data corresponding to the subsequent preference options, retrieve select second data based on the subsequent preference option data and structure a second presentation of the website based on the select second data.

In another aspect, the select second data is retrieved from a second website, wherein the second website different from the first website. In another aspect, the second website is located on a local area network (LAN), a wide area network (WAN), or anywhere in the world via the internet. In another aspect, the server further comprises computer executable instructions configured to generate a popup window, wherein the popup window comprises the targeted queries or prompts and is further configured allow entry of additional preference data.

Another embodiment includes a system comprising a client configured to provide initial preference data, receive a first presentation of a website based on initial preference input data, receive a web guide configured query or prompt for subsequent preference data based on the initial preference data and the first presentation of the website, and receive a second presentation of the website based on the subsequent preference data. In one aspect, the web guide comprises a popup window. In another aspect, the popup window is configured to float. In another aspect, the web guide allows searching of multiple websites essentially simultaneously. In another aspect, the web guide allow searching of websites located on a local area network (LAN), a wide area network (WAN), or anywhere in the world via the internet. In another aspect, the web guide includes a maximum number of queries or prompts. In another aspect, the maximum is 9 or less. In another aspect, the maximum is 7 or less.

Another embodiment includes a method comprising receiving initial preference data, retrieving select first data from the storage medium based on the initial preference data, structuring a first presentation of a first website based on the select first data, and providing a closed set of subsequent preference options based on the select first data. In one aspect, the method further comprises retrieving select second data based on a response to the subsequent preference options and providing a second presentation of the first website based on the select second data. In another aspect, retrieving the select second data comprises retrieving data from a second website, wherein the second website different from the first website. Another aspect further comprises at least one advertisement in the first presentation, the at least one advertisement based on the initial preference data. In another aspect, an owner of the advertisement is billed based on the amount of time or number of times the advertisement is shown to a user of the first website.

Another embodiment includes a computer readable medium comprising computer executable instructions for receiving initial preference data, retrieving select first data; and structuring a first presentation of a website based on the select first data, the first presentation including a closed set of subsequent preference options based on the select first data. In one aspect, the computer readable medium further comprises computer executable instructions for structuring a second presentation of the website based on subsequent preference data corresponding to the closed set of subsequent preference options.

Another embodiment includes a system comprising means for presenting an initial home page, the initial home page including initial preference options, means for receiving initial preference option data corresponding to the initial preference options, means for retrieving select first data based on the initial preference option data, and means for structuring a first presentation of a website based on the select first data, the first presentation including a closed set of subsequent preference options based on the select first data. In one aspect, the system further comprises means for receiving subsequent preference option data corresponding to the subsequent preference options, means for retrieving select second data based on the subsequent preference option data, and means for structuring a second presentation of the website based on the select second data. In another aspect, the system further comprises means for displaying advertising.

Websites according to some embodiments are designed according to principals similar to those used in service-oriented architecture (SOA). In computing, service-oriented architecture (SOA) provides methods for systems development and integration where systems group functionality around business processes and package these as interoperable services. SOA also describes information technology (IT) infrastructure which allows different applications to exchange data with one another as they participate in business processes. Service-orientation aims at a loose coupling of services with operating systems, programming languages and other technologies which underlie applications. SOA separates functions into distinct units, or services, which developers make accessible over a network in order that users can combine and reuse them in the production of business applications. These services communicate with each other by passing data from one service to another, or by coordinating an activity between two or more services.

SOA unifies business processes by structuring large applications as an ad hoc collection of smaller modules called "services". Different groups of people both inside and outside an organization can use these applications, and new applications built from a mix of services from the global pool exhibit greater flexibility and uniformity. Building all applications from the same pool of services makes achieving this goal much easier and more deployable to affiliate companies. For example: interacting with a rental car company's reservation system even doing so from an airline's reservation system.

One can define a service-oriented architecture (SOA) as a group of services that communicate with each other. The process of communication may involve either simple data-passing or two or more services coordinating some activity. Intercommunication implies the need for some means of connecting services to each other.

SOAs build applications out of software services. Services comprise intrinsically unassociated units of functionality that have no calls to each other embedded in them. SOA services typically implement functionality most humans would recognize as a service, such as filling out an online application for an account, viewing an online bank-statement, or placing an online booking or airline ticket order. Instead of services embedding calls to each other in their source code, they use defined protocols which describe how one or more services can talk to each other. This architecture typically relies on a business process expert to link and sequence services, in a process known as orchestration, to meet a new or existing business system requirement.

An application designer or engineer associates SOA objects by using orchestration. In the process of orchestration, a software engineer or process engineer associates relatively large chunks of software functionality (services) in a non-hierarchical arrangement (in contrast to a class hierarchy) by using a software tool which typically contains an exhaustive list of all of the services, their characteristics, and a is configured to record the designer's choices which the designer can manage and the software system can consume and use at run-time.

Underlying and enabling SOA is metadata in sufficient detail to describe not only the characteristics of these services, but also the data that drives them. Extensible Markup Language (XML) may be used, for example, in SOA to create data which is wrapped in a nearly exhaustive description container. Analogously, the services themselves can be described by Web Services Description Language (WSDL), and communications protocols by Simple Object Access Protocol (SOAP). Other languages and protocols, however, may be used. SOA uses data and services that are described using some implementation of metadata which typically meets the following two criteria:

1. the metadata should be in a form that software systems can use to configure themselves dynamically by discovery and incorporation of defined services, and also to maintain coherence and integrity,
2. the metadata should also be in a form that system designers can understand and manage at a reasonable cost and effort.

In one embodiment of a service oriented website, the web guide starts in the home page itself. The web guide may be represented by an icon. In one aspect, the icon may resemble a human guide. In one aspect, the icon may appear in the right hand bottom corner of the screen. The location of the icon is a matter of design choice and may be placed anywhere on the screen.

The web guide may ask the user for his needs/interest/intention of the visit, based on valid options appropriate for that website. In one embodiment, the maximum number of options presented to the user is seven. This number is based on the 1956 paper by Arthur Miller of Princeton University "The Magical Number Seven, Plus Or Minus Two: Some Limits On Our Capacity Of Processing Information," The Psychological Review, 1956, Vol. 63, Issue 2, pp. 81-97. In this paper, the author suggests that the average human can process seven unrelated pieces of information without error. In other embodiments, however, the maximum number of options may be greater than seven as appropriate for the website. The actual number of options may, of course, be less than the maximum number of options. Additionally, in some embodiments one of the options is 'default'. Default is an option that the user would choose when he really does not have any specific choice out of the given set. The 'default' option should satisfy the most frequent type of visitors.

Once the user chooses one of the options offered by web guide at home page, then choice-related web pages, and not all possible web pages, get dynamically structured for further navigation. The new web page, the choice home page, is displayed. In other words, the website structure is not frozen a priori by the designer. On the contrary, each web page should be provided with sufficient meta-data about the page content (and the level of detail) that it can be dynamically selected based on user's choice on the fly. The web pages structured under the choice home page include a small subset of pages out of the large number of available pages of the website which are available for further exploration.

Generally, the web guide for a particular website is initialized by having the user input initial preference data. After the initial preference data is entered, the web guide retrieves data based on the initial preference data to generate a first presentation of the website. Typically, the first presentation includes additional preference options which the user can select to further refine the website. In some aspects, the web guide includes default settings. The defaults may be desirable, for example, when the user has not entered an appropriate response or is not sure what to enter. The preference data, may, and generally will, vary from website to website. For example, an individual accessing a sports website searching for specific sports trivia would typically put in different preferences than if visiting an automobile website searching for a specific car to purchase.

The web guide is generally interactive. That is, after the initial preference data is entered and the preference profile generated, additional data can be parsed by the web guide to dynamically modify the website. Thus, after logging in or otherwise identifying themself to the website, the user may supply additional preference data. Indeed, during a browsing session, the user may continually supply additional preference data to refocus the presentation of the guided website.

Conceptually, at every page of exploration, the web guide may pop up with set of choices, and these set of choices are not fixed a priori, but get created dynamically, based on the history of choices made earlier. Further, the set of choices may also get created dynamically based on the amount of time spent on previous web pages. Usually, these choices are always based on the information content available at the website (and not based on any abstract category or classification) as the website can provide simply those services that it is capable of. Again, 'default' would generally be one of the choices available, satisfying the most common type of visitors (or when at that stage the user wants to let oneself guided by the choice of the web guide).

In some embodiments, at some page, if the number of available choices is far more than seven, then it is advisable to group choices into a primary set and a secondary set. The primary set is typically up to five in number, with one extra choice of 'more' comprising the secondary set. The secondary set may have more than seven options. In an alternative embodiment, the group of choices may be split into primary, secondary, and tertiary sets of options. In this manner, the set of options presented to the user at any one time may be kept to less than ten.

Additionally, information content can be presented at multiple levels of detail. For example, a newspaper typically presents information at different levels: head line, sub heading, first paragraph containing the gist, and the remaining story containing the detail. As the occasional visitor interest level is not known a priori, web content may also be kept in varying levels, e.g., brief, standard, and detail. In one embodiment, when information content is first shown, it may be in brief. The standard content follows the brief content. In one aspect, the detail content should be shown when demanded, and not otherwise.

In this approach, for occasional visitors of a large information rich website, the web guide interactively constructs visitor's interest/choice dimensions along with its level. The web guide accordingly goes on restructuring the website dynamically through selecting choice-relevant pages out of the total available web pages. In turn, the dynamically structured web page provides the visitor information services at an appropriate level of detail which completely satisfies his needs. Further, this approach may be implemented when each information page is associated with sufficient amount of meta-data characterizing its content and level of detail which would be used for dynamic selection based on the choices indicated by the user while navigating.

In some embodiments, additional preference data is entered via a popup box. In one aspect, the web guide is in a floating popup box. In this manner, the web guide can be moved about the screen as desired by the user. Optionally, the popup box can be configured so that it can be resized as desired by the user. In another aspect, the popup box can be configured so that it can be minimized (e.g. placed as an icon on a tray in a windows style program) without the web guide being terminated.

The web guide can retrieve information data from the website being accessed and reformat the presentation of the website based on the preference data of the user. The information data and the web guide software may be stored on the same server. However, the information data need not be stored on the same server. That is, the web guide software may be stored on a web server and the information data stored on the same server. Indeed, the information data may be spread on a plurality of separate data servers or in hard drives or other memory storage located near or remote from the web server.

In some embodiments, the web guide retrieves information data from other websites in addition to the website directly accessed by the user. The other websites may on the same server, in the same local area network (LAN), the same wide area network (WAN), or anywhere in the world via the internet. That is, based on the preferences selected by the user, relevant information can be retrieved from a large number of websites and presented to the user.

In some embodiments, the web guide includes a maximum number of queries or prompts for the user. For some users, having a small number of relevant queries or prompts is more pleasing than having to make a selection from a large menu of choices or answering a large number of queries. In one aspect, the number of choices is less than 9. In another aspect, the number of choices is less than 8. Indeed, the number of choices may be limited to 7, 6, 5, 4, 3, or 2. In some aspects, the user may have only a single option to select.

Model for the Web Guide Framework

In the web guide framework, a website is designed based on the service-oriented architecture approach. SOA actively helps to provide service to a visitor to a website based on the specific type of service requested by him. A website designed in this framework offers a closed set of interests/intentions/choices for a visitor to choose from, at various stages of navigation, generally starting from the home page itself. The set of interests represents the types of service the website offers to visitors at that stage, and expects that the visitors would be interested in one of the types being offered.

Further, in one aspect of the web guide framework, a visitor's navigation cursor has its own cursor-state. In this aspect, the cursor-state changes as a visitor navigates from one web page to another. This is contrary to the conventional web framework where the navigation cursor is 'stateless.'

Typically, in this framework, when a visitor enters the home page, the content of the home page is shown, but no local navigation link is shown to start with. The navigation cursor is at a 'start' state. To provide appropriate service to the visitor, the home page offers a set of interests (called, the primary or initial set of interests). The visitor is requested to choose one out of the offered set of interests, thereby indicating his interest/intention/choice. Once the visitor chooses his interest, called, his primary or initial interest, the navigation cursor gets stamped with this specific interest as the primary interest (setting navigation cursor's initial state). Then the possible set of navigation links from the home page, satisfying the visitor's primary interest, gets displayed.

In addition, an advertisement pages associated with the home page typically also changes to correspond to the visitor's interest. That is, the advertisement changes to correspond to the current state of the navigation cursor.

For another visitor who chooses a different interest from the home page's primary set of offered interests, the navigation cursor gets stamped accordingly, setting the cursor's initial state differently. Correspondingly, a different set of navigation links (and also the associated advertisement page) satisfying the primary interest of this second visitor is displayed. These two different set of navigation links based on different interests can have some common navigation links as well. That is, the intersection of these two sets need not be null.

As the web guide is based on the service oriented architecture approach, once the primary interest is indicated by a visitor at the home page, the website discards all those navigation links from the visitor's future navigation whose contents are at a variance with the visitor's interest. Similarly, those advertisement pages that are at variance with the visitor's interest also get filtered. That is, the web page displays merely those navigation links (and also the associated advertisement pages), that will guide further navigation to those web pages that are in sync with visitor's primary interest.

In the Web Guide Framework, the originating navigation links from the home page typically are the superset of all the possible sets of navigation links where each set corresponds to a possible distinct primary interest being offered by the website. When a visitor makes a choice, he simultaneously rejects the remaining choices being offered. And hence, those navigation links that corresponds to the rejected set of choices are dropped or made invisible, not merely from the home page, but also from other web pages, downstream.

After choosing one of the navigation links displayed, when a visitor reaches the next web page, this next web page shows its content. This web page may not show any navigation links, and may further inquire from the visitor his next level of interest out of possible still next level interest-set being offered by the website. For each web page, the offered interest-set is completely distinct from that of any other web page. Further, once a visitor chooses his next level interest, his navigation cursor is additionally stamped with this secondary interest, changing his cursor's state. Based on the current state of cursor, the web page now displays the possible navigation links (i.e., those set of navigation links that would guide the visitor to those web pages that are in sync with it, satisfying the visitor's primary as well as secondary levels of interests), and so on.

Again, the originating navigation links from a web page are the superset of all the possible sets of navigation links (where each set corresponds to a possible distinct interest being offered, at that page). The superset may also include some links that might have been dropped (or made invisible) due to choices rejected by visitor at previous web pages during navigation prior to reaching the current web page.

For a visitor navigating through the website in the web guide framework, at any stage, his navigation cursor's state indicates the sequences of interests he chose during his current navigation. In other words, at any stage, the cursor's state indicates the visitor's navigation history.

A visitor's navigation is accordingly guided to appropriate web pages that satisfy his set of interests, and typically nothing else. There is typically no possibility of the visitor getting lost, getting into loop, or unnecessarily wandering to those pages that are not at all of his interest.

The model does, however, provide a mechanism to backtrack the last navigation link. In essence, it is same as 'undoing.' That is, the cursor reverts back to its previous state and all navigation links made invisible due to last choice reappear. Further, the web guide may also provide a mechanism to jump back to the home page, setting cursor back to the start state, i.e., with null interest. In this manner, the website reverts back to its original form.

Node Types in the Web Guide Framework

In the web guide framework, there are two types of nodes, S-Nodes (Service Nodes) and T-Nodes (Content Nodes). S-Nodes are the service nodes that offer a visitor a set of interests for him to choose from, and once a choice is made the cursor state changes. On the other hand, T-Nodes are those nodes that do not offer any interest-set to a visitor to choose from, and hence, his cursor state remains unaltered. When a visitor reaches an S-Node, the visitor is shown navigation links after he has made his choice, and generally not before. When a visitor reaches a T-Node, the navigation links are shown simultaneously with the web page content. A T-Node can be viewed as an S-Node with null set of interests offered.

Typically, the navigation links displayed to a visitor by a T-Node is in sync with his current cursor state. If two distinct visitors having distinct cursors' states reach the same T-Node, it is very likely that the displayed set of navigation links to these two visitors may be different.

In the Web Guide frame work, the home page is an S-Node. The other nodes of the website can be either an S-Node or a T-Node. The choice between S-Node and T-Node depends upon the website designer to decide. That is, the website designer may select the set of nodes, their types, and the navigation architecture.

Intra Web Page Content Structure in a Web Guide Framework

In the web guide framework, visitors can reach a web page following two distinct navigation paths, i.e., with distinct cursor states. Generally, each node, irrespective of its type (S-Node or T-Node), displays the web page content as soon as a visitor reaches that node. In some embodiments, the content of a web page has a mandatory top section of static content, and optional one or more sections of dynamic contents. When a visitor reaches a node, the static content is shown at the top. Depending upon the cursor state, only those sections of dynamic contents of the web page are shown that are in sync with the cursor state. In other words, the dynamic content at that node that is shown to the visitor depends upon the navigation history of the visitor as well. In alternative embodiments, none of the sections are mandatory. That is, a top section of static content is not required.

Distinguishing Features of the Web Guide Framework

A website design using the web guide framework does not consider all visitors as an explorer, it actively interacts with the visitor. The web guide determines the visitor's interest/intention/choice progressively and guides him towards the web pages satisfying his set of interests. The website designer plans the set of S-Nodes (along with the associated set of interests) in order of their primacy, the set of T-Nodes, and their associated navigation links. Further, the content of a Node may itself be composed of static as well as optional sections of dynamic contents.

In the web guide framework, a website is active as it interacts with the visitor, asking him to indicate his interest out of an offered set, as it is designed on service oriented approach. The web guide framework can be also termed as visitor interest-sensitive as it asks the visitor to choose his interest at various levels of navigation through its set of S-Nodes. Further, the navigation structure of a website gets dynamically modified/created. That is, for different visitors with different interests, it presents different views. It is also navigation history-sensitive as well. Based on cursor's state, the website displays additional dynamic contents, associated advertisement pages, and corresponding emerging links. In brief, in the guided web frame, a website is active, service oriented, dynamic and navigation history-sensitive.

The Graph Model for Web Guide Framework

Consider at an S-Node (including the Home Node) each interest (out of the set of interests from which a visitor has to commit his interest) indicates a distinct color. So, for a website with 'm' S-Nodes-$(S_1, S_2, \ldots S_m)$, if Node $S_x$ has $C_x$ set of interests (colors), then the total number of distinct colors to represent the complete graph would be:

$$C_g = C_1 + C_2 + + \ldots C_m.$$

The graph model for the web guide framework is a graph with a set of nodes connected through a set of directed edges where:

Each Directed Edge is colored with one of the colors of the set $C_g$,

Each S-Node, $S_i$ carries a packet with $C_i$ number of color tokens, and

Each T-Node, $T_j$ does not carry any packet with tokens, and All outgoing directed edges of:

S-Node $S_i$ would be of one from the set of $C_i$ colors, and
T-Node $T_j$ would be of one from the set of $C_j$ colors (a subset of $C_g$), A visitor's cursor carries a packet to carry color tokens, representing its state.

When a visitor makes a choice at an S-Node, the cursor picks the corresponding color token from the S-Node, updating its own state.

At any T-Node, a visitor is not asked to make a choice, thus the cursor state remains unaltered.

In this model, any two nodes can be connected with multiple directed edges but each edge must be of different color. Further, there is no chance of any cyclic loop in this graph. When a visitor at the home page (the node $S_h$) chooses his interest out of $C_h$ set of colors, say $C_{i1}$, he in essence has rejected all colors of $(C_h-C_{i1})<C_g$. Then, the cursor saves in its packet the token of $C_{i1}$ color, indicating its state, and all directed edges which are of any color of $(C_h-C_{i1})$ are deleted, or made invisible from graph downstream. Nodes (S-Nodes or T-Nodes) downstream that are left with no incoming edge also get deleted or made invisible as well. By definition, there will not be any other S-Node that would have tokens of colors $(C_h-C_{i1})$.

When the visitor, through navigation reaches another S-Node, $S_x$, and chooses $C_{i2}$ out of $C_x$, and rejects remaining $(C_x-C_{i2})$ colors, the cursor now carries two tokens of colors $C_{i1}$ and $C_{i2}$, in that order in its packet, indicating its current state. The similar process of deleting (or making invisible) edges and nodes downstream, gets followed as discussed above. If visitor back tracks a link, this amounts to undoing all the actions performed for the last navigation, and the cursor reverts back to its previous state, making those links and nodes reappear again that were deleted (or made invisible) by last action.

As navigation progresses passing through a set of S-Nodes, the cursor keeps accumulating tokens of the chosen interests in the order of navigation in its packet, indicating its state, e.g., $(C_{i1}, C_{i2}, \ldots)$. In process, the system strips the graph further following the process described above. In other words, choosing a specific interest at an S-Node, results in 'trimming' of the graph of those nodes and edges of the graph that are not of visitor's interest. As a visitor continues his navigation expressing his interests, the graph gets progressively trimmed.

Model for Intra Web Page Content Structure

As expressed earlier, any web page, either S-Node or T-Node, typically has a section of static content, and optionally one or more sections of dynamic content. In a page, if additional sections of dynamic content exist, then generally each section is tagged with one or more color tokens. When a visitor reaches a web page, the section of static content is generally always shown. If the page has sections of dynamic content, typically only that section of dynamic content would be shown whose tagged color token(s) matches with that carried by the cursor. In other words, the web page provides dynamic page content that is in sync with visitor's interest.

EXAMPLES

FIG. 1 illustrates a first embodiment. This system 100 includes a server includes a server 102 and a storage medium 104 operatively connected to the server. The server includes a microprocessor (not shown) and web guide software. The web guide software includes computer executable code which allows the server 102 to: (1) present an initial home page, the initial home page including initial preference options, (2) receive initial preference option data corresponding to the initial preference options, (3) retrieve select first data based on the initial preference option data, and (4) structure a first presentation of a website based on the select first data, the first presentation including a closed set of subsequent preference options based on the select first data. Also illustrated in FIG. 1 is a client 106. The client 106 is typically a personal computer. The client 106, however, may be a terminal, a so-called "web device," or any other device capable of browsing, including for example, personal digital assistants (PDA), and other mobile, handheld computing devices.

Figure 40:
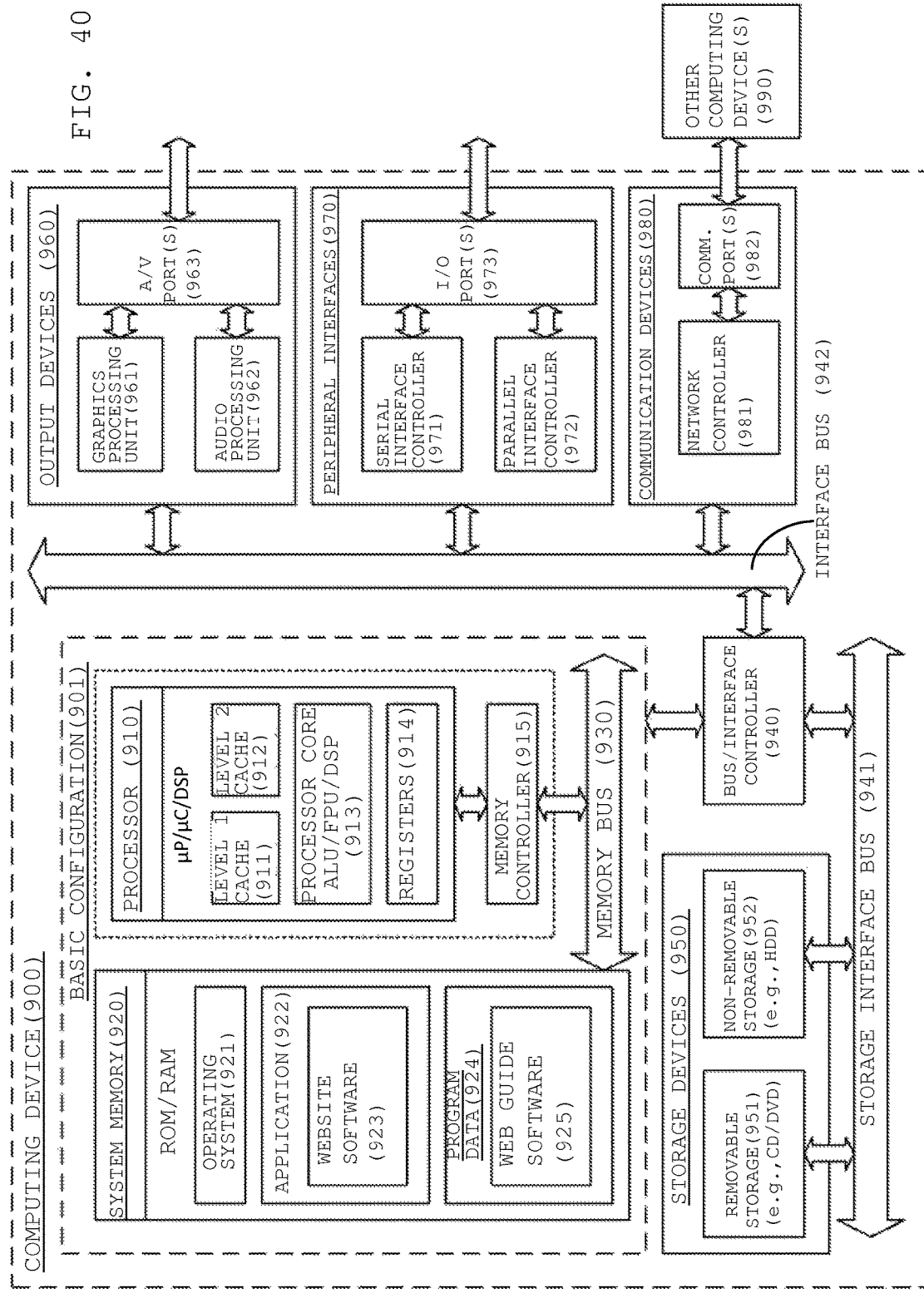
FIG. 40 is a block diagram illustrating an example computing device 900 according to an embodiment.

FIG. 40 is a block diagram illustrating an example computing device 900 that may be used as the server 102. In a very basic configuration, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor (µP), a microcontroller (µC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes website software 923 that is arranged to present a website to a user. Program Data 924 includes web guide software 925 that is arranged to assist the user in exploring a web site. In some embodiments, application 922 can be arranged to operate with program data 924 on an operating system 921. This described basic configuration 901 is illustrated in FIG. 40 by those components within dashed line.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which can be arranged to facilitate communications with one or more other computing devices 990 over a network communication via one or more communication ports 982. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

Figure 2:
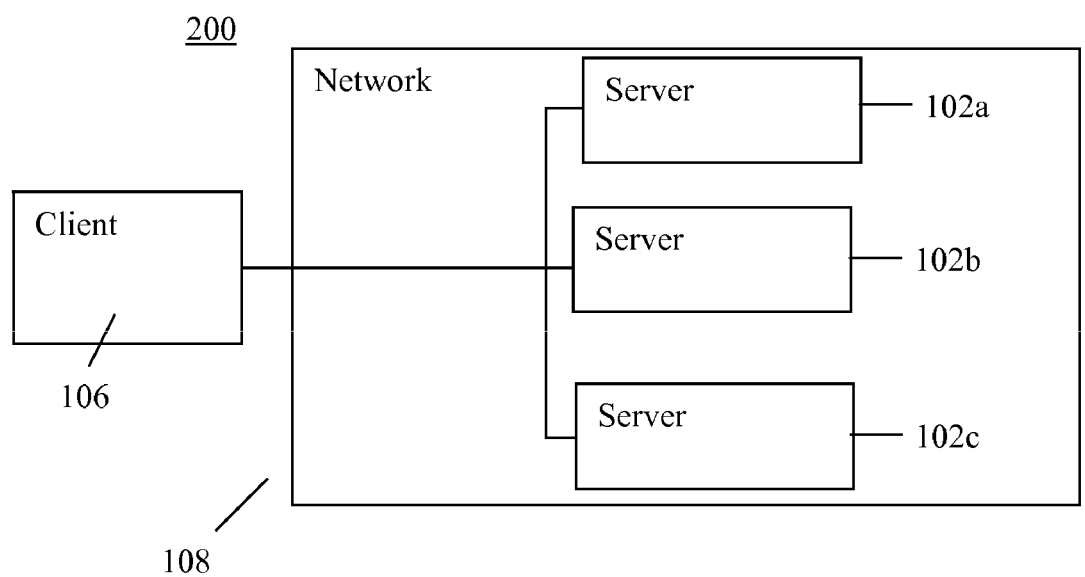
FIG. 2 is a schematic diagram of a system according to another embodiment.

FIG. 2 illustrates another embodiment. The system 200 of this embodiment includes a client 106 and a network 108 which may comprise multiple servers 102a, 102b, 102c. The network 108 may be a LAN, a WAN, the internet. In this embodiment, one or more guided websites 400 may be stored on any or all of the servers 102a, 102b, 102c. Further, in this embodiment, a web guide 404 on the network 108 can access some or even all of the servers 102a, 102b, 102c on the network 108. That is, a guided website 404 may retrieve data from any or all of the servers 102a, 102b, 102c. The actual servers 102a, 102b, 102c from which data is retrieved depends on the user's preferences, that is, the data being sought.

Figure 3:
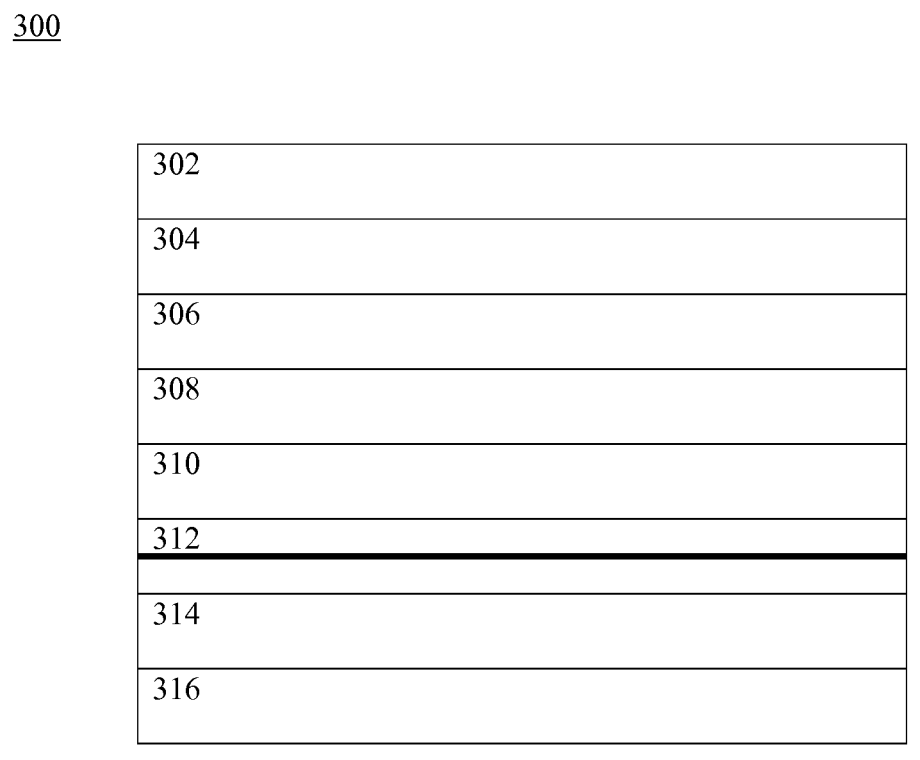

FIG. 3 illustrates methods according to an embodiment. In this embodiment, the method 300 includes the steps of receiving initial preference data 302, retrieving select first data from the storage medium based on the preference profile 304, structuring a first presentation of a first website based on the select first data 306 and providing a closed set of subsequent preference options based on the select first data 308. In another embodiment, the method includes the steps of retrieving select second data based on a response to the subsequent preference options 310 and providing a second presentation of the first website based on the select second data 312.

In some embodiments of the method, retrieving the select second data 310 includes retrieving data from a second website. Generally the second website is different from the first website. In still another embodiment, the method includes retrieving select second data from a multitude of different websites 314. For example, an individual looking to purchase a specific new car could simultaneously search all of the local car dealerships for a particular make and model with a single guided web search.

In another embodiment, the method includes a step of providing at least one advertisement 316. Generally, the advertisement based on the user's preferences. The advertisement may be based on the initial preference data or subsequent preferences entered by the user. Indeed, the advertisement presented to the user may change as the user's preferences change. Additionally, in some embodiments, the owner of the advertisement may be billed based on the amount of time or number of times the advertisement is shown to a user of the first website.

FIGS. 4-39 illustrate an implementation of the web guide. In this embodiment, the layout of the website presentation is as follows: the left column contains the 'navigation menu', the central portion contains the 'web content' (Image at the top and 'text content' below), and the right column contains advertisement at the top, and web guide (asking for 'perspective') below. Generally, use of the web guide is optional. That is, it is not mandatory to use to the web guide. A user can ignore it and can continue to navigate through the menu shown at the left column. If a user is not utilizing web guide, the website behaves as a standard website.

In this example, the left column contains the navigation menu (as in any standard website case), the middle section contains the web content (image+text content of Qutab Minar which represents Delhi as a city of heritage interest), the right column top includes the 'standard' advertisement of the website, and the lower right column is the web guide (FIG. 4). The web guide asks the user to choose his 'primary' perspective out of the offered four perspectives.

To get the help of the web guide user chooses one out of the four perspectives offered by the web guide (FIG. 4). The user may, for example, choose 'tourist' as the primary perspective. This choice indicates that user is a 'tourist', and he wants the help from web guide suitable for a tourist. Upon selecting 'tourist', the web content shown in the middle section of the page is that of Lal Quila (Red Fort) (FIG. 5). The Red Fort is the most popular monument among the tourists, and hence, it is shown in the center. On the left panel, there are five options for navigation. Most of the tourists would find these five options as most natural.

The top page of the text content about Lal Quila (Red Fort) is written for 'general audience' but the 'additional' text content (which can be seen by pressing 'more' hyperlink below) has been written assuming that the audience is a 'tourist' (FIG. 6). This additional page is shown only for 'tourist', and not in the standard website navigation case. It should be noted, however, that Lal Quila is also one of the options in the pull-down menu under Monuments. Therefore, on choosing that option this web content could also be reached. Additionally, the advertisement on the right top corner is of an interest to a standard 'tourist'.

The user can navigate according to the navigation menu shown in the left panel and that view all of the places that are of interest to a 'standard tourist'. The web guide, in this case (FIG. 6), allows the user to further specify his perspective with four sub-perspectives (Most Popular, 'Historical', 'Religious', and 'Educational'). The user can ignore these sub-perspectives, and go ahead with his navigation through left pane, as 'standard tourist navigation'. Alternatively, he can choose one of the sub-perspective options proposed by the web guide. That is, the user can take the help of web guide for further navigation.

The visitor can place his cursor over any of the five options, shown in the left panel, and see drop down menus providing further options for each of five options. Representative examples are illustrated in figures from FIG. 7 to FIG. 11. Each drop down menu shows the set of Delhi Monuments/Museums/Religious Places/ . . . that would be interesting from a 'tourist' perspective. Each of these set are actually subset of all Monuments/Museums/Religious Places/ . . . , that are in Delhi, and also in the website. The web guide has made this subset, knowing that the user is a 'tourist'.

Navigation with the four sub-perspectives is illustrated in FIGS. 12-39. The user can navigate with all the four sub-perspectives, one by one. The remaining discussion focuses on the historical and religious sub-perspectives.

'Historical' as the Sub-Perspective

In this example, the user is a 'tourist' interested in 'historical aspects' of Delhi (FIG. 19-25). Here again, the Qutab Minar is in the central panel indicating that it is the most important monument from 'historical' sub-perspective as well. The left panel includes a menu. The left panel menu gives five options of navigations—'Ancient', 'Sultanate' (period), 'Mughal Period', 'British Period', and 'Events' (historical events' sites). The five options correspond to a 'Tourist-Historical perspective'. Each option includes a 'pull-down' menu that corresponds to sites that correspond to Tourist-Historical Perspective. These options need not come in cases of 'standard website navigation' or 'standard tourist navigation'. However, many of the choices in the pull-down menu may be covered under different options in other navigation paths.

The web content of 'Qutab Minar' (illustrated in FIG. 19, on the top page shows the standard tourist content (same as shown earlier in FIG. 4), but the additional content covered through 'more' hyperlink (shown in FIG. 20), is written with 'historical perspective'. Though not discussed in detail in this example, the web content of any one of the options chosen from the left panel pull-down menu (e.g., 'Ashoka Engravings' under 'Ancient', or 'Tughlakabad Fort' under 'Sultunate', or 'President House' under 'British Period', etc.) would follow the same content structure. That is, the top page content from 'tourist' perspective, and additional content under 'more' hyperlink with 'historical' sub-perspective.

The right panel top includes an advertisement (FIGS. 19-25) that corresponds to the interest of those tourists who have 'historical' sub-perspective. Additionally, there is nothing shown in the bottom of right column. This means the web guide does not offer any further depth of perspective.

'Religious' as the Sub-Perspective

In this example, the user is a 'tourist' interested in 'religious aspects' of Delhi (FIG. 26-33). On the top, the Akshar Dham temple is illustrated. This is the temple which is most popular among religious tourists. The left panel includes options which a religious tourist would be looking for. The first three options are religion specific. The lower three options, though not connected with any religion, are those places where a religious tourist would like to visit as well. Each of the six options gives a 'pull-down' menu that corresponds to sites that correspond to Tourist-Religious Perspective.

As discussed earlier, these options may not be available in the case of 'standard website navigation' or 'standard tourist navigation.' However, many of the choices in the pull-down menus may be covered under different options in other navigation paths.

The web content of 'Akshar Dham' temple, in the center of the page (FIG. 26), is for a standard tourist. Following the 'more' hyperlink, however, provides additional content (FIG. 27) which is written for a tourist having the 'religious sub-perspective'. Although not discussed in more detail, the web content of any one of the options chosen from the Left panel pull-down menu (e.g., 'Kalkaji Temple' under 'Hindu Religion' or 'Hazrat Nizamuddin' under 'Islam Religion', or 'Sisgunj' under 'Sikh/other Religion', etc.) would follow the same content structure. That is, the top page from 'tourist' perspective, and additional content under 'more' hyperlink with 'religious' sub-perspective.

The Advertisement on the right panel top of the web page (FIGS. 26-33) corresponds to the interest of those tourists who have 'religious' sub-perspective. Additionally, there is nothing shown in the bottom of Right Column. It means the web guide does not offer any further depth of perspective.

The Algorithm presented in the present example is but one of the possible algorithms to implement website under the web guide framework.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A server-based method, comprising:
receiving initial preference data associated with a user;
retrieving select first data from a storage medium based on the initial preference data;
sending a first presentation of a first web site based on the initial preference data and a navigation history of a user device;
sending a query for subsequent preference data based on the initial preference data associated with the user;
receiving the subsequent preference data; and
sending a second presentation of the first website based on the subsequent preference data;
wherein at least one of the first presentation of the first website or the second presentation of the first website includes dynamic content created based on the navigation history of the user device.

2. The server-based method of claim 1, wherein the sending of the first presentation of the first website is from a same server from which the initial preference data is received.

3. The server-based method of claim 1, wherein the sending of the first presentation of the first web site is from a different server from which the initial preference data is received.

4. The server-based method of claim 1, further comprising reformatting the first presentation of the first web site based on the received initial preference data.

5. The server-based method of claim 4, wherein the initial preference data is associated with one or more webpages, each of which is either a first type of webpage that provides the user a set of interests from which to choose or a second type of webpage that does not provide the user any sets of interests from which to choose.

6. The server-based method of claim 5, wherein a navigation structure of the first website is dynamically structured with at least some of the webpages of the first type and of the second type.

7. The server-based method of claim 4, further comprising reformatting the first presentation of the first website based on the navigation history of the user device.

8. The server-based method of claim 1, wherein the receiving the subsequent preference data includes retrieving, from a second website and bypassing the first website, the subsequent preference data based on a response to the query for the subsequent preference data.

9. The server-based method of claim 1, further comprising reformatting the second presentation of the first website based on the received subsequent preference data.

10. The server-based method of claim 1, wherein the subsequent preference data includes a guide of websites based on metadata included in the received subsequent preference data.

11. The server-based method of claim 1, wherein the first presentation includes at least one advertisement, the at least one advertisement based on the received initial preference data.

12. The server-based method of claim 11, further comprising billing an owner of the at least one advertisement based on an amount of time or number of times the at least one advertisement is displayed on the first website.

13. A non-transitory computer-readable medium configured to store computer-executable instructions that, when executed, cause one or more processors to:

display an initial home page of a first website, the initial home page including initial preference options;
receive initial preference data associated with a user;
retrieve select first data from a storage medium based on the initial preference data;
send a first presentation of the first website based on the initial preference data and a navigation history of a device associated with the user;
send a query for subsequent preference data based on the initial preference data associated with the user;
receive the subsequent preference data; and
send a second presentation of the first website based on the subsequent preference data;
  wherein at least one of the first presentation of the first website or the second presentation of the first website includes dynamic content created based on the navigation history.

14. The computer-readable medium of claim 13, wherein the computer executable instructions, when executed, further cause the one or more processors to reformat the first presentation of the first web site based on the received initial preference data.

15. The computer-readable medium of claim 14,
wherein the initial preference data is associated with one or more webpages, each of which is either a first type of webpage that provides the user a set of interests from which to choose or a second type of webpage that does not provide the user any sets of interests from which to choose, and
  wherein a navigation structure of the first website is dynamically structured with webpages of the first type and the second type.

16. The computer-readable medium of claim 13, wherein the computer executable instructions, when executed, further cause the one or more processors to reformat the second presentation of the first website based on the received subsequent preference data.

17. The computer-readable medium of claim 13, wherein the receiving the subsequent preference data includes retrieving, from a second website and bypassing the first website, the subsequent preference data based on a response to the query for subsequent preference data, and
  wherein the received subsequent preference data includes a guide of websites based on metadata included in the subsequent preference data.

18. The computer-readable medium of claim 13, wherein the computer executable instructions, when executed, further cause the one or more processors to include at least one advertisement in the display of the first web site, the at least one advertisement based on the initial preference data.

19. The computer-readable medium of claim 13, wherein a server storing the initial preference data associated with the user and the server sending the first presentation of the first web site are same.

20. The computer-readable medium of claim 13, wherein a first server storing the initial preference data associated with the user and a second server sending the first presentation of the first web site are different servers.

* * * * *